овalid (12) United States Patent
Stamps et al.

(10) Patent No.: US 8,226,355 B2
(45) Date of Patent: Jul. 24, 2012

(54) TORQUE COUPLING FOR ROTARY-WING AIRCRAFT

(75) Inventors: Frank B. Stamps, Colleyville, TX (US); Richard Rauber, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 1082 days.

(21) Appl. No.: 11/629,027

(22) PCT Filed: Apr. 19, 2006

(86) PCT No.: PCT/US2006/014644
§ 371 (c)(1),
(2), (4) Date: Jun. 7, 2008

(87) PCT Pub. No.: WO2007/064351
PCT Pub. Date: Jun. 7, 2007

(65) Prior Publication Data
US 2008/0267778 A1    Oct. 30, 2008

(51) Int. Cl.
*B64C 27/32* (2006.01)
(52) U.S. Cl. ........................................ 415/119; 416/103
(58) Field of Classification Search ............... 416/134 A, 416/103, 106, 148
See application file for complete search history.

(56) References Cited

U.S. PATENT DOCUMENTS

| | | | |
|---|---|---|---|
| 4,804,352 A | 2/1989 | Schmidt | |
| 5,165,853 A | 11/1992 | Pancotti | |
| 6,019,578 A | 2/2000 | Hager et al. | |
| 6,030,177 A | 2/2000 | Hager | |
| 6,607,357 B2 | 8/2003 | Caramaschi | |
| 6,712,313 B2 * | 3/2004 | Zoppitelli et al. | 416/151 |

FOREIGN PATENT DOCUMENTS

| | | |
|---|---|---|
| JP | 2001130494 A | 5/2001 |
| JP | 2002337796 A | 11/2002 |

OTHER PUBLICATIONS

Extended European Search Report in European Application 06750638.6, dated May 13, 2011, 4 pages.

* cited by examiner

*Primary Examiner* — Richard Edgar
(74) *Attorney, Agent, or Firm* — James E. Walton; Noah A. Tevis (57) ABSTRACT

A torque coupling (13) for a rotor head (11) of a rotary-wing aircraft has upper and lower plates (29, 31) configured for rotation with a rotor mast (19). Drive links (33) pivotally connected to the upper and lower plates (29, 31) pivot about a pivot axis generally parallel to and radially offset from an axis of rotation of the plates. Each link (33) is engaged with adjacent drive links (33) to form a continuous ring of links, such that motion of one link (33) about its pivot axis causes motion in an opposite direction of each adjacent link (33) about its pivot axis. Drive elements (25) connect the drive links (33) to an assembly configured to receive rotor blades. The drive elements (25) may be components of a universal joint, a multiple trailing-link configuration, a pad-bearing configuration, or another type of articulating assembly.

20 Claims, 7 Drawing Sheets

TORQUE COUPLING FOR ROTARY-WING AIRCRAFT

TECHNICAL FIELD

The present invention relates generally to torque couplings and relates particularly to torque couplings used in rotor heads of rotary-wing aircraft.

DESCRIPTION OF THE PRIOR ART

Rotor heads of rotary-wing aircraft, such as helicopters and tiltrotors, are rotated using a rotor mast. Unfortunately, various forces can be produced within the rotor head assembly, leading to undesirable vibration or other effects encountered by components of the rotor head. One example of an undesirable effect is a "scissors" binding within prior-art designs, this binding causing oscillatory drive forces.

One method for relieving these forces is shown in U.S. Pat. No. 6,712,313 to Zoppitelli, et al., in which a driving disk rotates with a rotor mast and is connected to each of two driven disks on either side of the driving disk by at least one connecting pin. Each pin is hinged to each of the disks by one of three ball joint connections, and each of the driven disks is connected to a hub of the rotor by at least one of two driving devices. Each of the two driving devices is also hinged to the hub, so that the hub is driven in rotation about a geometrical axis which can be inclined in all directions about the axis of rotation of the mast.

Whereas the Zoppitelli device may provide for relief of the oscillatory drive forces, the configuration has significant disadvantages. For example, the assembly is large, which reduces the volume available in the hub for rotating controls. In addition, the assembly is relatively heavy, which is particularly undesirable in a rotary-wing aircraft.

SUMMARY OF THE INVENTION

There is a need for an improved torque coupling that provides for kinematic scissoring motion to relieve kinematic binding in rotor heads of rotary-wing aircraft.

Therefore, it is an object of the present invention to provide an improved torque coupling that provides for kinematic scissoring motion to relieve kinematic binding in rotor heads of rotary-wing aircraft.

A torque coupling for a rotor head of a rotary-wing aircraft has upper and lower plates configured for rotation with a rotor mast. Drive links pivotally connected to the upper and lower plates pivot about a pivot axis generally parallel to and radially offset from an axis of rotation of the plates. Each link is engaged with adjacent drive links to form a continuous ring of links, such that motion of one link about its pivot axis causes motion in an opposite direction of each adjacent link about its pivot axis. Drive elements connect the drive links to an assembly configured to receive rotor blades. The drive elements may be components of a universal joint, a multiple trailing-link configuration, a pad-bearing configuration, or another type of articulating assembly.

The present invention provides for several advantages, including: (1) high-torque capacity; (2) reduced size and weight; and (3) more stability in a rotor of a tiltrotor aircraft when the rotor is oriented in airplane mode.

BRIEF DESCRIPTION OF THE DRAWINGS

For a more complete understanding of the present invention, including its features and advantages, reference is now made to the detailed description of the invention taken in conjunction with the accompanying drawings in which.

DESCRIPTION OF THE PREFERRED EMBODIMENT

The present invention provides a high-torque coupling adaptable for use in a rotor head of a rotary-wing aircraft. The coupling provides for a kinematic scissoring motion that relieves the kinematic binding which causes oscillatory drive forces in previous designs. Also, the coupling of the invention has the advantages of reduced size and reduced weight over previous designs. The reduced size allows for maximizing the envelope for the rotating controls, resulting in more favorable control system coupling terms and, when used in the hub of a tiltrotor aircraft, a more stable rotor hub in airplane mode.

Figure 1:
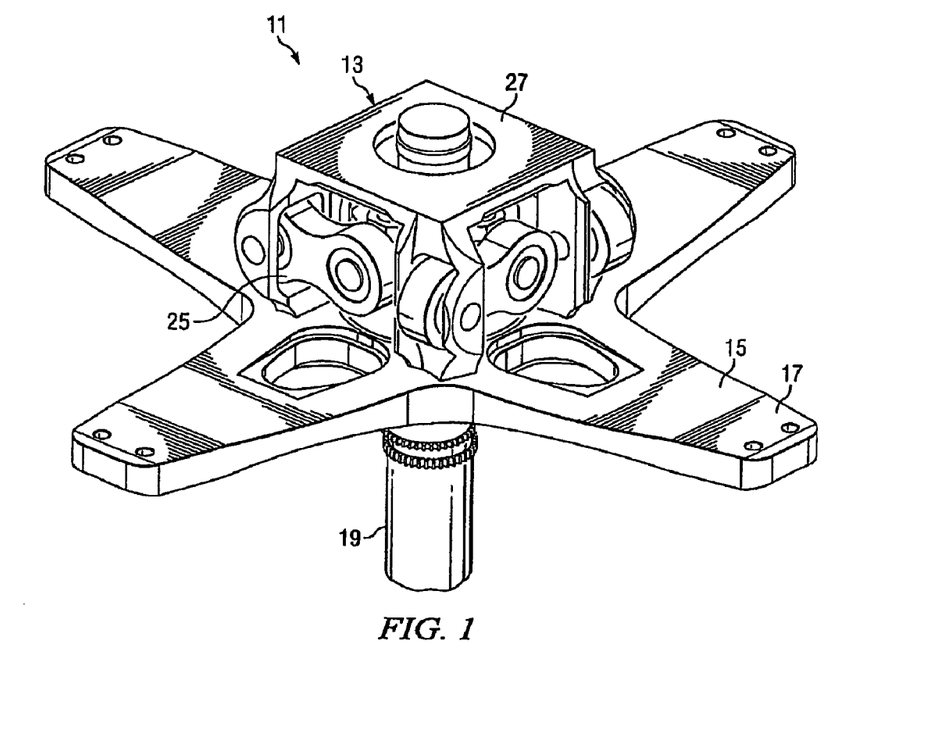
FIG. 1 is a view of a rotor head assembly incorporating a torque coupling according to the present invention.
Figure 2:
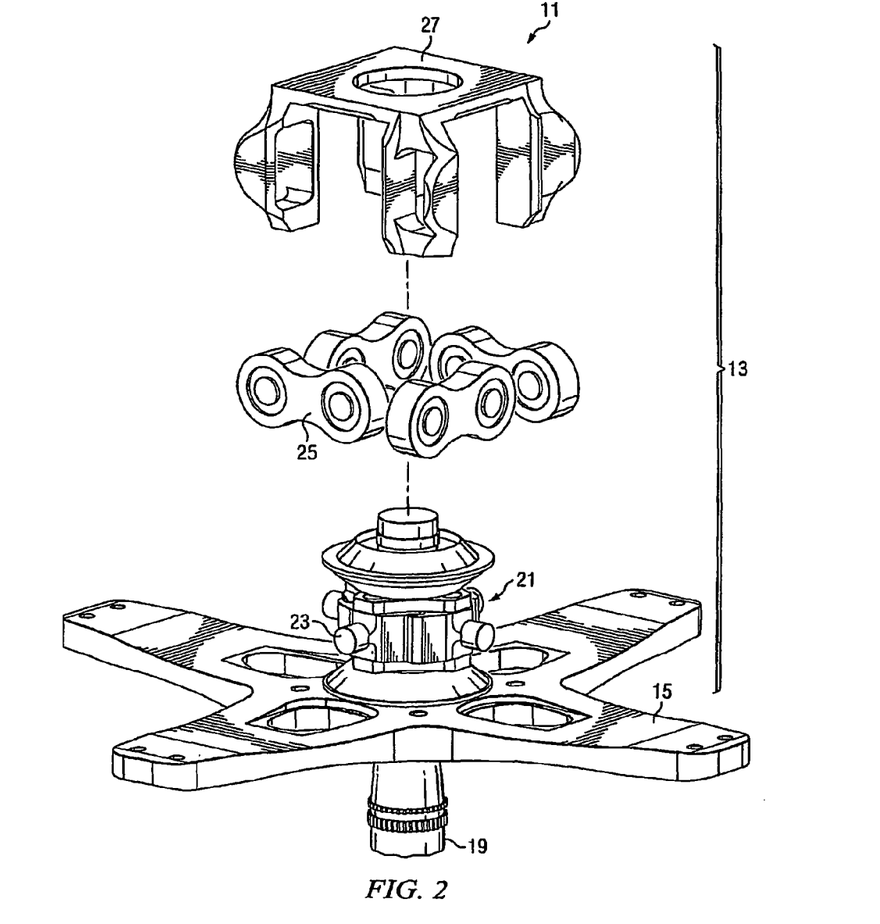
FIG. 2 is a partially exploded view of the assembly of FIG. 1.

Referring to the figures, FIGS. 1 and 2 show a rotor head 11 for a rotary-wing aircraft, rotor head 11 incorporating a torque coupling 13 according to the present invention. Rotor head 11 comprises coupling 13 and a yoke 15 rigidly mounted to coupling 13 for rotation with coupling 13. Yoke 15 is configured to allow for rotor blades (not shown) to be attached to outer portions 17 of yoke 15. Rotor head 11 is shown assembled onto a rotor mast 19 for rotation of rotor head 11 when mast 19 is rotated.

FIG. 2 is a view of rotor head 11 with coupling 13 shown partially exploded. Torque is transferred from mast 19 into a scissors-relief mechanism 21 (described below), then into a drive device attached to yoke 15, the drive device preferably being a constant-velocity joint or similar device. As shown in the embodiment of FIGS. 1 and 2, torque is transferred from trunnions 23 of mechanism 21 into drive elements 25 and then into frame 27. Frame 27 is rigidly attached to yoke 15, and the ends of each drive element 25 are pivotally attached to one trunnion 23 and to one corner of frame 27. This configuration allows for gimballing of frame 27 and yoke 15 relative to scissors mechanism 21 and mast 19 while providing a constant path for torque from mast 19 to yoke 15. Though shown as a set of four pivoting drive elements 25, it should be noted that other types of linkages may be used to connect trunnions 23 to frame 27. In addition, other types of couplings may be used to connect trunnions 23 to yoke 15, and two alternative embodiments are described below.

Figure 3:
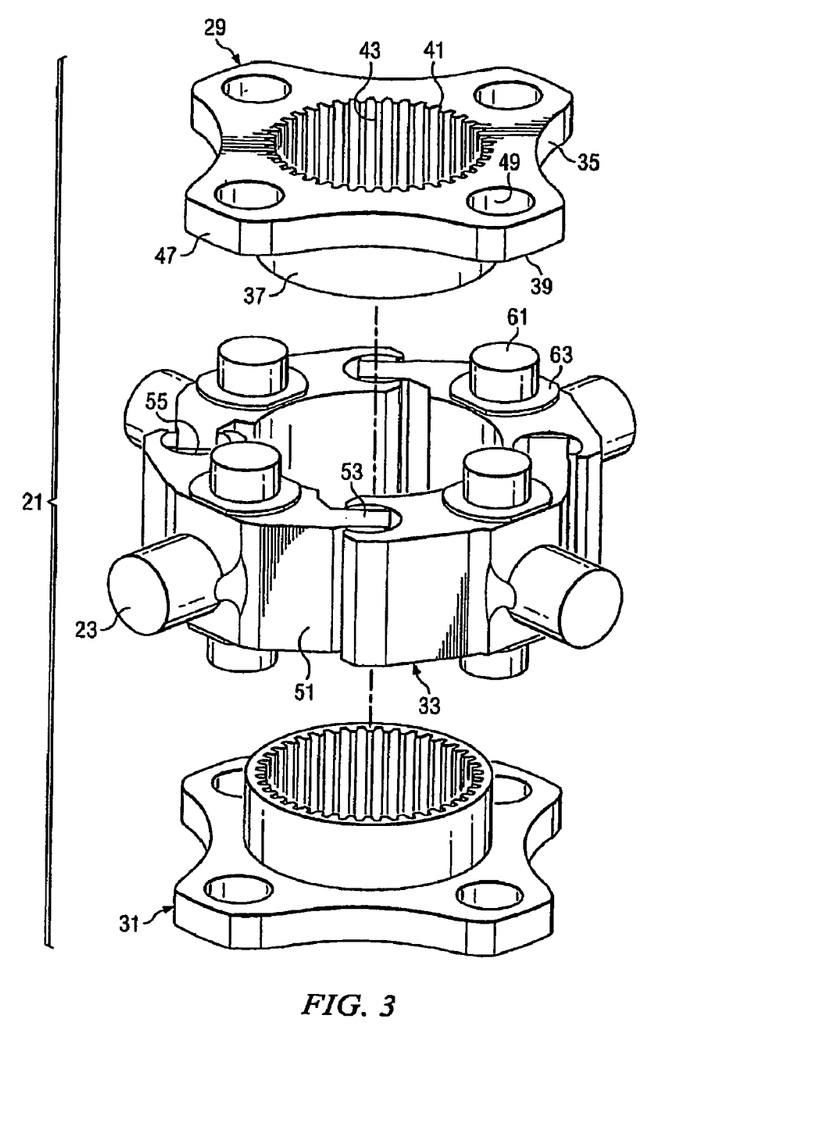
FIG. 3 is a partially exploded view of a scissors mechanism of the torque coupling of FIG. 1.
Figure 4:
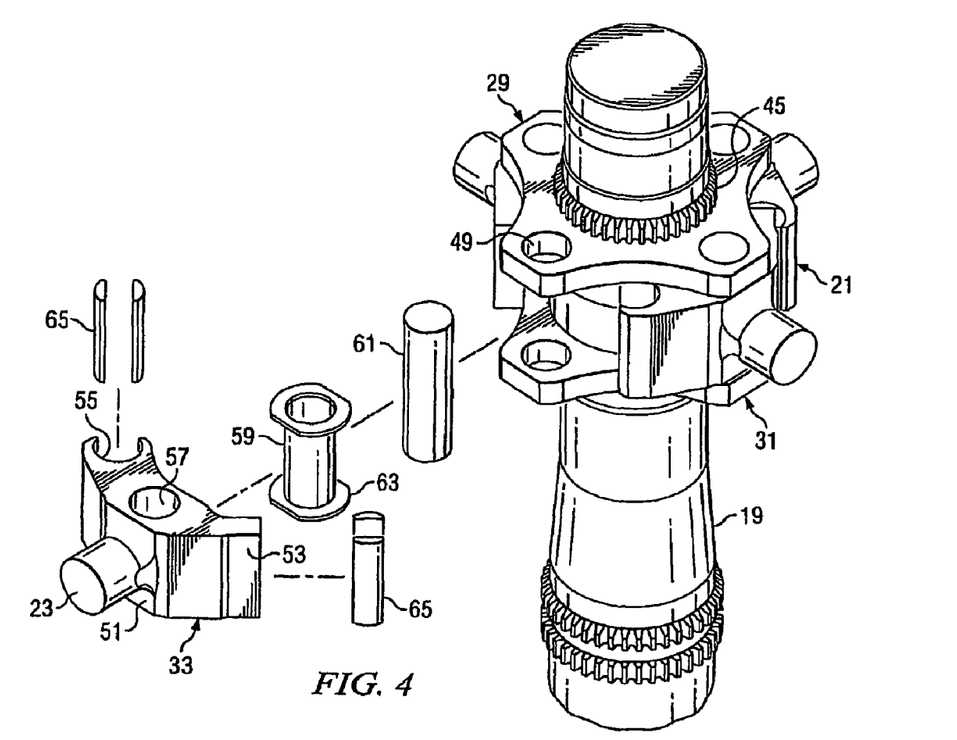
FIG. 4 is a partially exploded view of the scissors mechanism of FIG. 3 assembled onto a rotor mast for a rotary-wing aircraft.

FIGS. 3 and 4 are partially exploded views of scissors mechanism 21 according to the present invention. Mechanism 21 comprises an upper plate 29, a lower plate 31, and a number of drive links 33. Plates 29, 31 are similarly constructed and will be described with reference to plate 29.

Plates 29, 31 comprise a planar section 35 and a central cylindrical section 37 extending from an inner surface 39 of planar section 35. A circular bore 41 extends through planar section 35 and cylindrical section 37, bore 41 having internal splines 43 extending in a direction parallel to an axis of bore 41 and configured for engaging corresponding splines on a shaft, such as splines 45 on mast 19, inserted into bore 41. Each planar section 35 has four arms 47 extending radially about bore 41, each arm 47 having a circular bore 49 extending therethrough. Each bore 49 has an axis parallel to the axis of bore 41. When plates 29, 31 are assembled together, the ends of cylindrical sections 37 abut each other.

Each drive link 33 is a rigid member comprising a body 51, tang 53, slot 55, and trunnion 23. As shown in the exploded portion of FIG. 4, a bore 57 extends through body 51, bore 57 being sized for receiving a cylindrical bushing 59. The central bore of bushing 59 is sized for receiving cylindrical pin 61, as is each bore 49 of plates 29, 31. Pin 61 protrudes beyond body 51 and extends through aligned bores 49 of plates 29, 31, and thrust washers 63 are located between each arm 47 and the associated bushing 59. Thus, each drive link 33 is pivotally connected to plates 29, 31 in a double-shear arrangement, with pin 61 being located within bushing 59 in bore 57. This allows link 33 to pivot relative to pin 61 and plates 29, 31 about a pivot axis located on the central axis of pin 61, the pivot axis being generally parallel to the axis of rotation of mast 19 and plates 29, 31.

Drive links 33 are arranged in a continuous ring around cylindrical sections 37 of plates 29, 31, with each tang 53 and slot 55 of one drive link 33 engaging the slot 55 and tang 53, respectively, of adjacent drive links 33. Bearings 65 are located between each tang 53 and the inner surface of the associated slot 55 for allowing rotation and translation of each tang 53 within and relative to slot 55.

Figure 5:
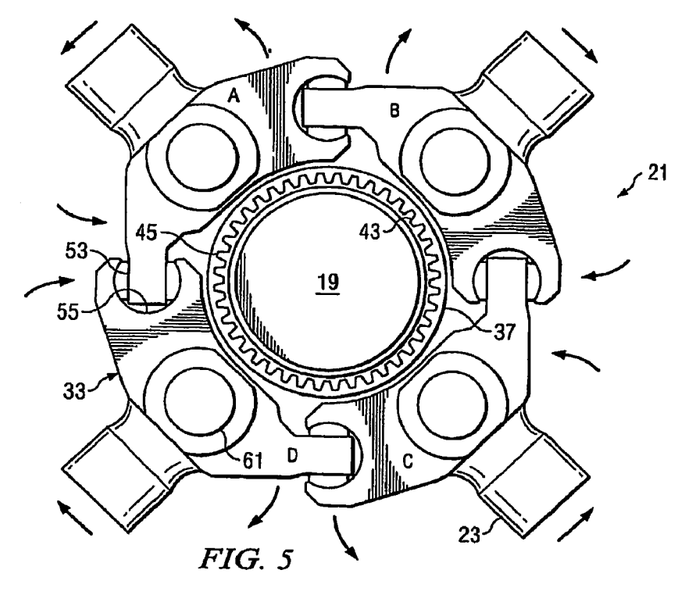
FIG. 5 is a top view of the assembly of FIG. 4, an upper plate of the scissors mechanism having been removed.

Referring to FIGS. 4 and 5, mechanism 21 is shown assembled on rotor mast 19. External splines 45 on mast 19 engage internal splines 43 of plates 29, 31 for transferring torque from mast 19 into plates 29, 31. The combination of drive links 33 being pivotally connected to plates 29, 31 with pins 61 and tangs 53 and slots 55 being rotatable and translatable relative to each other provides for limited rotation of drive links 33 relative to each other while torque is constantly transferred from plates 29, 31 and through pins 61 to drive links 33.

FIG. 5 is a top view of mechanism 21 assembled onto mast 19, upper plate 29 having been removed to allow viewing of the ring of drive links 33. The limited rotation allowed for drive links 33 relative to each other provides for relief of oscillatory forces encountered during a scissors-type oscillation, in which forces urge pairs of trunnions 23 in opposite directions, while mast 19 and mechanism 21 rotate together. This scissors action is illustrated in FIG. 5, in which drive links 33 are labeled as A, B, C, and D for ease of reference. In this example, forces urge trunnions 23 of drive links A and B to move in opposite directions, with A being urged in a counter-clockwise direction and B being urged in a clockwise direction. Because of the pivotal attachment of drive links 33 to plates 29, 31, drive links A, B rotate about their respective pins 61 in the direction of the force and in opposite directions relative to each other. Tang 53 of drive link A engages slot 55 of drive link D, and the counter-clockwise rotation of drive link A causes clockwise rotation of drive link D. Likewise, tang 53 of drive link C engages slot 55 of drive link B, and the clockwise rotation of drive link B causes counter-clockwise rotation of drive link C. The result is relative motion between trunnions 23 of drive links C, D that mirrors the motion between trunnions 23 of drive links A, B. The motions of all drive links A, B, C, D are linked, which limits relative motion to this scissors-type motion. Because of the nature of this linkage, the number of drive links must be four for a system having rigid components and small mechanical tolerances.

Referring again to FIG. 4, it should be noted that, instead of having a bore 57 and using a pin 61 and bushing 59 in bore 57 to allow for rotation of each drive link 33, drive links 33 may alternatively be formed to have integral pivot trunnions (not shown) extending in opposite directions from body 51 at the location where bore 57 would have been formed. The pivot trunnions would allow each link 33 to pivot relative to plates 29, 31 about a pivot axis generally parallel to the axis of rotation of mast 19 and plates 29, 31. A cylindrical bushing would be installed between each pivot trunnions and the corresponding bore 49 in plates 29, 31.

Figure 6:
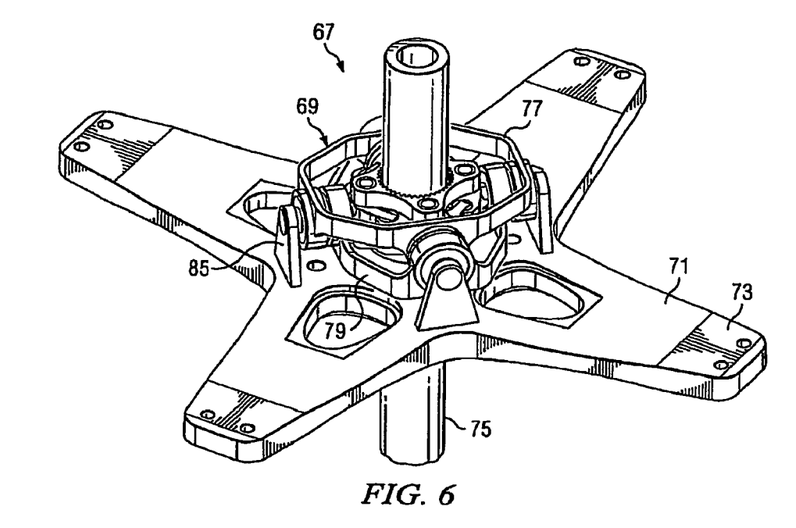
FIG. 6 is a view of an alternative embodiment of a rotor head assembly incorporating a torque coupling according to the present invention.
Figure 7:
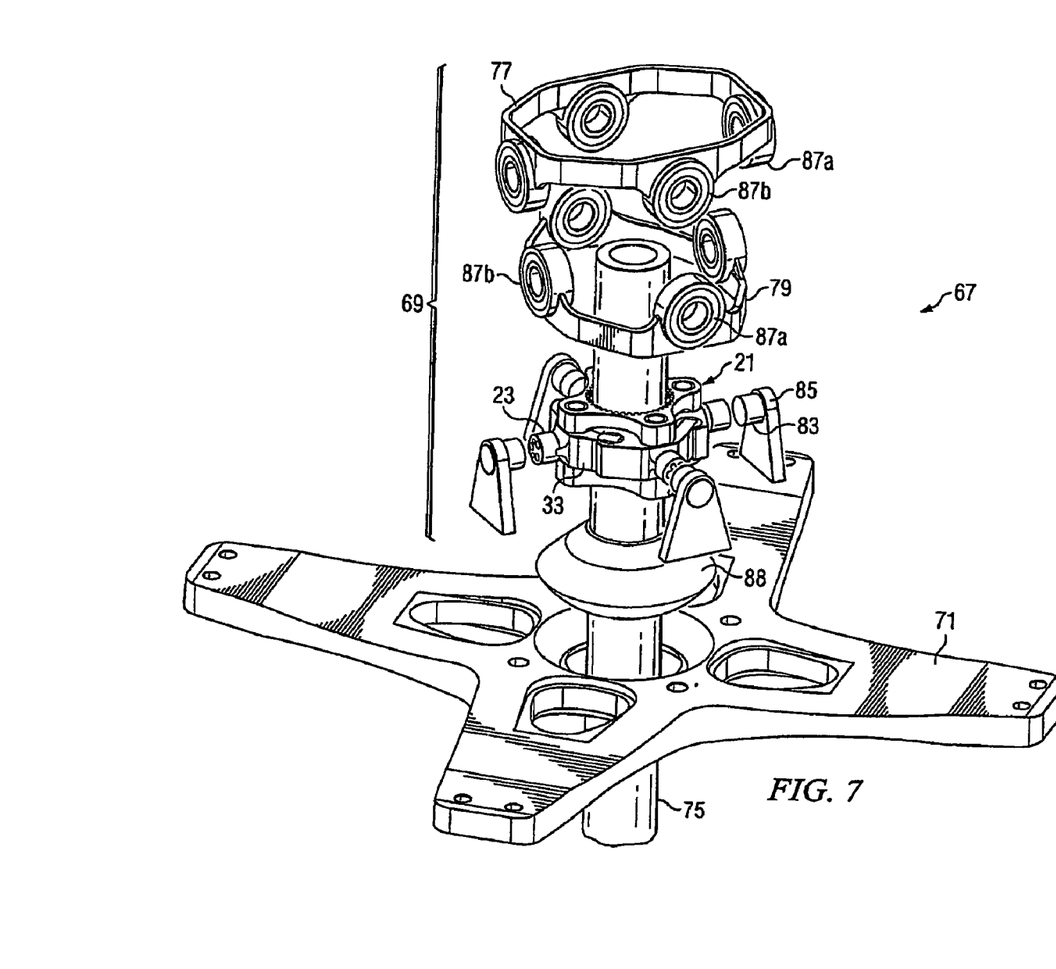
FIG. 7 is a partially exploded view of the rotor head of FIG. 6.
Figure 8:
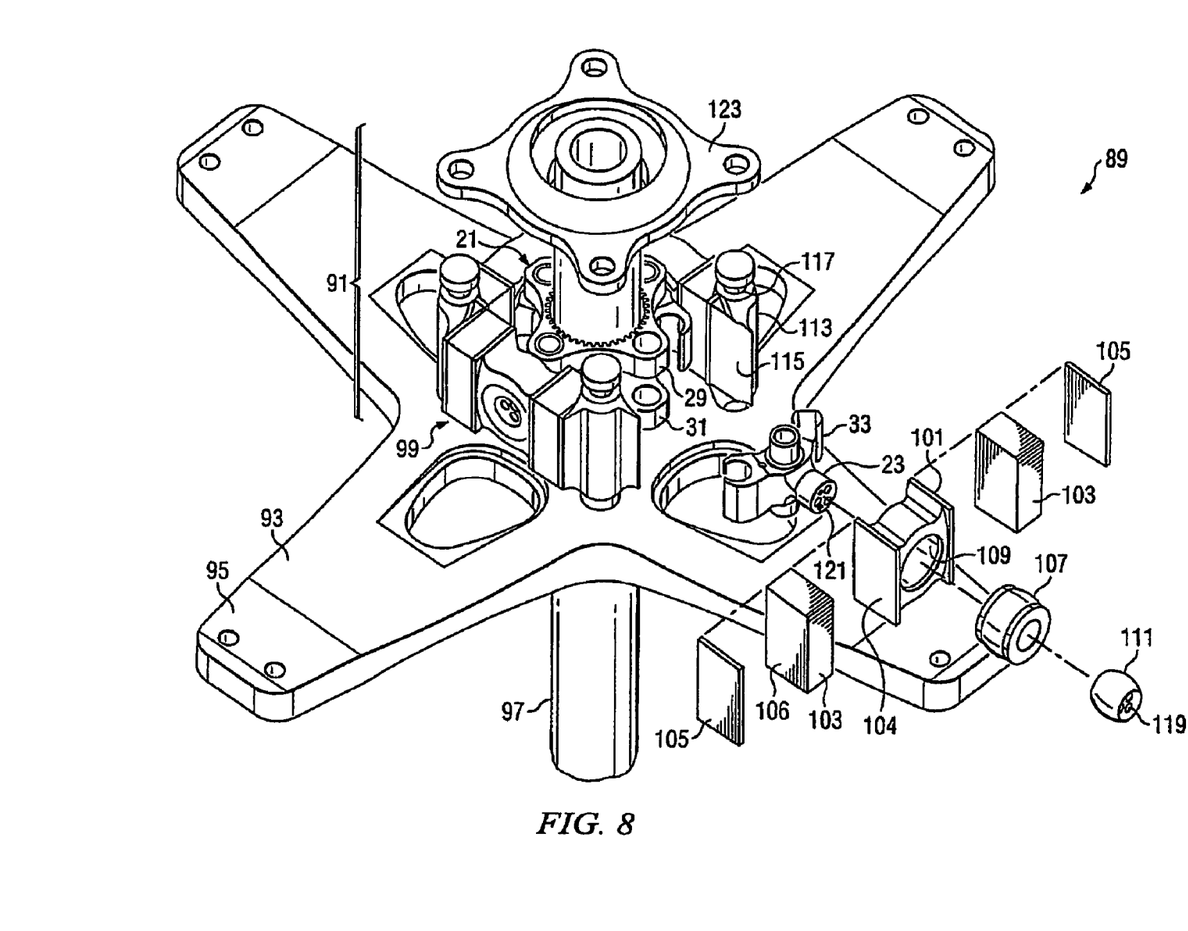
FIG. 8 is a partially exploded view of a second alternative embodiment of a rotor head assembly incorporating a torque coupling according to the present invention.

Examples of alternative embodiments of rotor heads incorporating torque couplings of the present invention are shown in FIGS. 6 through 8. Referring to FIGS. 6 and 7, a rotor head 67 according to the present invention comprises a torque coupling 69. A yoke 71 is mounted to coupling 69 for rotation with coupling 69, yoke 71 being configured to allow for rotor blades (not shown) to be attached to outer portions 73 of yoke 71. Rotor head 67 is shown assembled onto a rotor mast 75 for rotation of rotor head 67 when mast 75 is rotated.

FIG. 7 is a view of rotor head 67 with coupling 69 shown partially exploded. Torque is transferred from mast 75 into a scissors-relief mechanism 21, as described above in FIGS. 3 through 5. Torque is then transferred into a gimbal coupling, which is shown in FIGS. 6 and 7 as being a two-piece universal joint formed from upper member 77 and lower member 79, though other types of gimbal couplings may be used. A trunnion 83 extends inwardly from each of an array of supports 85 rigidly connected to yoke 71, each trunnion 83 being located near and coaxial with a trunnion 23 of each drive link of mechanism 21. Members 77, 79 each have an array of two opposing outer bearings 87a and two opposing inner bearings 87b. Each outer bearing 87a is configured for pivotally receiving a trunnion 83, and each inner bearing 87b is configured for pivotally receiving a trunnion 23. For each member 77, 79 of coupling 69, torque is transferred from trunnions 23 into members 77, 79 through the corresponding pair of opposing inner bearings 87b. Torque is then transferred from each member 77, 79 into trunnions 83 and supports 85 through the pair of opposing outer bearings 87a of each member 77, 79. Thus, each member 77, 79 is free to rotate relative to the other member 77, 79 about an axis passing through each pair of opposing inner bearings 87b. In combination with an upper hub spring (not shown) and lower hub spring 88, this configuration allows for gimballing of yoke 71 relative to scissors mechanism 21 and mast 75 while providing a constant path for torque from mast 75 to yoke 71.

Referring to FIG. 8, a second alternative embodiment of a rotor head according to the invention is shown. Rotor head 89, which is shown partially exploded, comprises a pad-bearing torque coupling 91 according to the present invention. A yoke 93 is mounted to coupling 91 for rotation with coupling 91, yoke 93 being configured to allow for rotor blades (not shown) to be attached to outer portions 95 of yoke 93. Rotor head 89 is shown assembled onto a rotor mast 97 for rotation of rotor head 89 when mast 97 is rotated.

Coupling 91 comprises a scissors mechanism 21, as described above, which is preferably connected to mast 97 by splines for transfer of torque. Torque is then transferred from trunnions 23 on drive links 33 into pad-bearing assemblies 99 connected to yoke 93. In the figure, one drive link 33 and one pad-bearing assembly 99 are shown exploded from the remaining assembly.

Each pad-bearing assembly 99 comprises a central member 101 and elastomeric pad bearings 103 located on opposing sides of central member 101 and adhered or otherwise affixed to an outer surface 104 of central member 101. A thrust plate 105 is adhered or otherwise affixed to an outer surface 106 of each pad bearing 103. Each pad-bearing assembly is configured to allow limited movement of central member 101 relative to thrust plates 105 through deformation of pad bearings 103. A spherical bearing 107 is mounted within a bore 109 in central member 101, and a rigid inner sleeve 111 is locate within the central portion of spherical bearing 107. When installed, pad bearing assemblies 99 are located between pairs of bearing supports 113, each support 113 having support surfaces 115 generally perpendicular to each other. Bearing supports 113 are attached to yoke 93 with pins 117, such that support surfaces 115 of adjacent bearing supports 113 face each other for creating mounting locations for bearing assemblies 99.

When installed, trunnion 23 of each drive link 33 is received within sleeve 111 of bearing 107. An alignment pattern 119 is formed in sleeve 111 for cooperative engagement with a corresponding alignment pattern 121 on the outer end of trunnion 23. Each thrust plate 105 is affixed to a corresponding support surface 115 of each of a pair of bearing supports 113, allowing torque to be transferred from trunnions 23 through sleeves 111 and spherical bearings 107 into central members 101, and then through pad bearings 103 and thrust plates 105 into bearing supports 113. The torque is then transferred from bearing supports 113 into yoke 93 through pins 117. In combination with an upper hub spring 123 and a lower hub spring (not shown), the torque coupling configuration allows for gimballing of yoke 93 relative to scissors mechanism 21 and mast 97 while providing a constant path for torque from mast 97 to yoke 93.

The present invention provides for several advantages, including: (1) high-torque capacity; (2) reduced size and weight; and (3) more stability in a rotor of a tiltrotor aircraft when the rotor is oriented in airplane mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A torque coupling for a rotor head of a rotary-wing aircraft, the coupling comprising:
at least one drive plate, each plate being adapted for rotation with a rotor mast;
drive links, each link being pivotally connected to each plate for pivoting about a pivot axis generally parallel to and radially offset from an axis of rotation of each plate, each link being engaged with adjacent drive links to form a continuous ring of links, such that motion of one link about its pivot axis causes motion in an opposite direction of each adjacent link about its pivot axis;
drive elements adapted for connecting the drive links to an assembly configured to receive rotor blades.

2. The torque coupling according to claim 1, wherein:
the at least one plate is configured to receive the mast.

3. The torque coupling according to claim 1, wherein:
each drive link comprises a central body and components on opposing ends of the body for engaging adjacent drive links.

4. The torque coupling according to claim 1, wherein:
each drive link comprises a central body, a slot on one end of the body, and a tang on an opposite end of the body, the tang of each drive link being configured for pivotally engaging the slot of an adjacent drive link.

5. The torque coupling according to claim 1, wherein:
each drive link comprises a trunnion extending from the drive link in a direction generally perpendicular to its pivot axis, each trunnion being configured for connecting the associated drive link to a drive element.

6. The torque coupling according to claim 1, wherein:
the drive elements form a multi-piece universal joint.

7. The torque coupling according to claim 1, wherein:
each drive element is a pivoting link.

8. The torque coupling according to claim 1, wherein:
each drive element is a pad bearing.

9. A scissoring torque coupling for a rotor head of a rotary-wing aircraft, the coupling comprising:
upper and lower plates, the plates being adapted for rotation with a rotor mast;
drive links, each link being pivotally connected to the upper and lower plates for pivoting about a pivot axis generally parallel to and radially offset from an axis of rotation of the plates, each link being engaged with adjacent drive links to form a continuous ring of links, such that motion of one link about its pivot axis causes motion in an opposite direction of each adjacent link about its pivot axis;
drive elements adapted for connecting the drive links to an assembly configured to receive rotor blades.

10. The torque coupling according to claim 9, wherein:
at least the lower plate is configured to receive the mast.

11. The torque coupling according to claim 9, wherein:
each drive link comprises a central body and components on opposing ends of the body for engaging adjacent drive links.

12. The torque coupling according to claim 9, wherein:
each drive link comprises a central body, a slot on one end of the body, and a tang on an opposite end of the body, the tang of each drive link being configured for pivotally engaging the slot of an adjacent drive link.

13. The torque coupling according to claim 9, wherein:
each drive link comprises a trunnion extending from the drive link in a direction generally perpendicular to its pivot axis, each trunnion being configured for connecting the associated drive link to a drive element.

14. The torque coupling according to claim 9, wherein:
the drive elements form a multi-piece universal joint.

15. The torque coupling according to claim 9, wherein:
each drive element is a pivoting link.

16. The torque coupling according to claim 9, wherein:
each drive element is a pad bearing.

17. A method for relieving kinematic binding and oscillatory drive forces in a rotor head of a rotary-wing aircraft, the method comprising:
(a) connecting at least one plate to a rotor mast for rotation with the mast;
(b) pivotally connecting drive links to each plate, each link being pivotable about a pivot axis generally parallel to and radially offset from an axis of rotation of each plate, each link being engaged with adjacent drive links to form a continuous ring of links, such that motion of one link about its pivot axis causes a motion in an opposite direction of each adjacent link about its pivot axis;
(c) connecting each drive link to a yoke assembly configured to receive rotor blades;
(d) during rotation of the rotor head, allowing limited motion of the links relative to each other about their respective pivot axes.

18. The method according to claim 17, wherein:
step (c) comprises connecting each drive link to the yoke assembly using a multi-piece universal joint.

19. The method according to claim 17, wherein:
step (c) comprises connecting each drive link to the yoke assembly using a trailing link.

20. The method according to claim 17, wherein:
step (c) comprises connecting each drive link to the yoke assembly using a pad bearing.

* * * * *